United States Patent Office 3,467,689
Patented Sept. 16, 1969

3,467,689
**PROCESS FOR OBTAINING PARACHLORO-
PHENYLISOCYANATE**
Adrian Moldovan Velniceriu and Traian Mihaiu,
Bucharest, Rumania, assignors to Ministerul Industriei
Chimice, Bucharest, Rumania, a corporation of
Rumania
No Drawing. Filed July 18, 1966, Ser. No. 565,717
Claims priority, application Rumania, July 26, 1965,
50,068
Int. Cl. C07c *119/04*
U.S. Cl. 260—453                                   2 Claims

ABSTRACT OF THE DISCLOSURE

A process for preparing parachlorophenylisocyanate in toluene solution wherein phosgene is bubbled through a toluene solution of parachloroaniline with an amine/toluene ratio of 1 to 4 at a temperature of 100° to 105° C. with a molar ratio of phosgene to amine of 1.05 and in the presence of 0.1 gram of activated carbon per gram of parachloroaniline.

---

The present invention relates to a process for obtaining parachlorophenylisocyanate in solution, from parachloroaniline and gaseous phosgene, in the presence of catalysts.

A known process for obtaining parachlorophenylisocyanate from parachloroaniline and phosgene requires the formation of the reaction intermediate N-parachlorophenylcarbamylchloride. The work is performed with amine and phosgene solutions. This known process has the disadvantage that two separate solutions are required, namely, the amine solution and the phosgene solution, the solvents being the same or different. The phosgenation takes place in stages, beginning at low temperatures and reaching temperatures up to 140–150° C.; also a considerable excess of phosgene is necessary.

It is an object of the invention to provide an improved process for obtaining p-chlorophenylisocyanate in solution.

According to this invention all these disadvantages of earlier systems are removed by a method which involves the direct reaction of phosgene with parachloroaniline in toluene at an amine/toluene ratio = 1 to 4, a molar ratio of phosgene/amine of 1.05, at a reaction temperature of 100° to 105° C., and in the presence of active carbon amounting to 10 to 20 grams/100 grams of amine (preferably 0.1 gram active carbon per gram of parachloroaniline).

Example

The reaction vessel is a 1500 ml. sulphonation flask, provided with stirrer, reflux cooler (condenser), thermometer, dropping funnel heated to 40°–50° C. with a long stem extending to the bottom of the flask and a phosgene bubbling tube. 200 grams of toluene, 10 grams of granulated active carbon without additives, previously dried for a period of 2 hours at 120° C. and having an adsorption capacity of 450–550 grams $I_2$/g. are introduced in the flask.

The resulting mixture is heated to 100°–105° C. and phosgene is bubbled into the flask at the rate of 40.7 grams/hour over a period of 5 minutes.

The parachloroaniline solution, prepared by dissolving 100 grams of parachloroamine in 200 grams of toluene and heating at 40°–50° C., is fed to the reaction vessel at a rate of 150 grams/hour solution (50 grams of parachloroaniline/hour).

The parachloroaniline solution temperature is maintained at 40–50° C., and the phosgenation temperature at 100°–105° C.

After the amine supply is terminated, phosgene bubbling is ended since phosgenation is complete. Nitrogen or carbon dioxide is bubbled into the reactor at a rate of 50 liters/hour, until any excess phosgene and the hydrochloric acid formed as a byproduct are eliminated; during this step the temperature is maintained at 100°–105° C.

After cooling at 20–30° C., the reaction mixture is filtered through a porous-plate filter. One obtains 493 grams of 23.6% parachlorophenylisocyanate solution in toluene (corresponding to 116.34 grams of parachlorophenylisocyanate); this represents a conversion of better than 96% with respect to the parachloroaniline.

The solution also contains about 1% (4.9 grams of N,N'-di-parachlorophenylurea. The content in parachlorophenylisocyanate was determined by treatment with heavy volatile aliphatic amines in dioxane.

The advantages of the method of the invention include increased yield and higher productivity, elimination of some separate operations (e.g. obtaining the phosgene solution), limitation of phosgene excesses; the parachlorophenylisocyanate is obtained in a single stage, thereby eliminating the formation of parachlorophenylcarbamylchloride as an intermediate; and the resulting parachlorophenylisocyanate solution can be directly used for other syntheses (e.g. condensation with alkylamines).

We claim:
1. A process for obtaining a toluene solution of parachlorophenylisocyanate, comprising the step of bubbling phosgene through a toluene solution of parachloroaniline with an amine/toluene ratio of 1 to 4 at a temperature of 100° to 105° C. and with a molar ratio of phosgene to amine of 1.05, in the presence of activated carbon as a catalyst in an amount of 0.1 gram of activated carbon per gram of parachloroaniline.
2. The process defined in claim 1 wherein said amine/toluene ratio is 1/2.

References Cited

UNITED STATES PATENTS

| 2,362,648 | 11/1944 | Lichty et al. | 260—453 |
| 2,689,861 | 9/1954 | Thompson | 260—453 |
| 2,908,703 | 10/1959 | Latourette et al. | 260—453 |

CHARLES B. PARKER, Primary Examiner

D. H. TORRENCE, Assistant Examiner

U.S. Cl. X.R.
260—553, 578